US008143364B2

(12) United States Patent
Bleys et al.

(10) Patent No.: US 8,143,364 B2
(45) Date of Patent: Mar. 27, 2012

(54) COMPOSITION MADE FROM A DIISOCYANATE AND A MONOAMINE AND PROCESS FOR PREPARING IT

(75) Inventors: Gerhard Jozef Bleys, Heverlee (BE); Hans Godelieve Guido Verbeke, Lubbeek (BE)

(73) Assignee: Huntsman International LLC, The Woodlands, TX (US)

( * ) Notice: Subject to any disclaimer, the term of this patent is extended or adjusted under 35 U.S.C. 154(b) by 224 days.

(21) Appl. No.: 12/282,540

(22) PCT Filed: Feb. 12, 2007

(86) PCT No.: PCT/EP2007/051335
§ 371 (c)(1),
(2), (4) Date: Sep. 11, 2008

(87) PCT Pub. No.: WO2007/104623
PCT Pub. Date: Sep. 20, 2007

(65) Prior Publication Data
US 2009/0069456 A1  Mar. 12, 2009

(30) Foreign Application Priority Data
Mar. 14, 2006 (EP) ..................... 06111114

(51) Int. Cl.
*C08G 18/16* (2006.01)
(52) U.S. Cl. ........... 528/49; 528/59; 528/76; 528/78; 564/32; 564/37; 564/47; 564/50; 564/52; 564/55; 564/56; 521/67; 521/137; 521/159; 521/160; 521/163; 521/167; 525/452; 525/457; 252/182.2; 252/182.29
(58) Field of Classification Search ............ 521/67, 521/137, 159, 160, 163, 167, 128, 130; 525/452; 525/457; 564/32, 37, 47, 50, 52, 55, 56; 528/49, 59, 76, 78; 252/182.2, 182.29
See application file for complete search history.

(56) References Cited

U.S. PATENT DOCUMENTS

| 2,925,387 A | 2/1960 | Traise et al. |
| 2,946,767 A | 7/1960 | Gassmann |
| 3,015,625 A | 1/1962 | Rosscup et al. |
| 3,401,027 A | 9/1968 | Dreher et al. |
| 3,741,911 A | 6/1973 | Shane |
| 4,237,237 A | 12/1980 | Jarre et al. |
| 4,261,845 A * | 4/1981 | Cuscurida ............ 508/552 |
| 4,438,250 A * | 3/1984 | Grogler et al. ............ 528/66 |
| 4,499,254 A | 2/1985 | Dominguez et al. |
| 4,692,255 A | 9/1987 | Matzat et al. |
| 4,751,253 A | 6/1988 | Tylenda |
| 4,764,541 A | 8/1988 | Brasington et al. |
| 4,785,027 A | 11/1988 | Brasington et al. |
| 4,791,146 A | 12/1988 | Tylenda |
| 4,882,408 A | 11/1989 | Blum |
| 5,145,591 A | 9/1992 | Kinoshita et al. |
| 5,364,909 A | 11/1994 | Guo et al. |
| 5,489,620 A | 2/1996 | Bleys |
| 5,591,779 A | 1/1997 | Bleys et al. |
| 5,849,850 A | 12/1998 | Bleys et al. |
| 6,034,149 A | 3/2000 | Bleys et al. |
| 6,218,462 B1 | 4/2001 | Pantone et al. |
| 6,271,277 B1 | 8/2001 | Bleys et al. |
| 6,355,721 B1 | 3/2002 | Pantone et al. |
| 2004/0054117 A1 | 3/2004 | Wamprecht et al. |
| 2004/0158022 A1 | 8/2004 | Baumgart et al. |
| 2005/0049358 A1* | 3/2005 | Dai et al. .............. 524/589 |
| 2005/0131095 A1 | 6/2005 | Yu et al. |
| 2007/0148471 A1* | 6/2007 | Rukavina et al. ...... 428/423.1 |

FOREIGN PATENT DOCUMENTS

| DE | 2418075 | 10/1975 |
| DE | 3132760 | 3/1983 |
| EP | 41618 | 12/1981 |
| EP | 1106634 | 6/2001 |
| GB | 1169737 | 11/1969 |
| GB | 1250401 | 10/1971 |
| JP | 07258374 | 10/1995 |
| JP | 07324161 | 12/1995 |
| WO | WO 95/23819 | 9/1995 |
| WO | WO 02/098943 | 12/2002 |
| WO | WO 2004/014980 | 2/2004 |

OTHER PUBLICATIONS

Jeffamine M-1000 Product Data Sheet. http://www.huntsman.com/performance_products/Media/JEFFAMINE_M-1000_US_(2-08).pdf.*
Jeffamine M-2070 Product Data Sheet. http://www.huntsman.com/performance_products/Media/JEFFAMINE_M-2070_US_(2-08).pdf.*

* cited by examiner

*Primary Examiner* — Milton I Cano
*Assistant Examiner* — Michael L Leonard
(74) *Attorney, Agent, or Firm* — Robert A. Diaz

(57) ABSTRACT

Process for preparing a composition by reacting a polyisocyanate, a monoalkoxy polyoxyalkylene monoamine and water. The composition and its use in making cellular products are claimed as well.

11 Claims, No Drawings

COMPOSITION MADE FROM A DIISOCYANATE AND A MONOAMINE AND PROCESS FOR PREPARING IT

CROSS REFERENCE TO RELATED APPLICATIONS

This application is the National Phase of International Application PCT/EP2007/051335 filed Feb. 12, 2007 which designated the U.S. and which claims priority to European (EP) Pat. App. No. 06111114.2 filed Mar. 14, 2006. The noted applications are incorporated herein by reference.

The present invention is related to a novel composition made from a diisocyanate and a monoamine and to a process for making such composition.

Products made from a diisocyanate and a monoamine are known, see U.S. Pat. No. 4,261,845.

In WO 02/098943 products made from a polyisocyanate, a polyamine, a monoamine and/or water have been described.

US 2005/049358 discloses the preparation of reaction products of a polyisocyanate and a polyether amine for use as water dispersible compositions. These compositions are subsequently added to water.

WO 95/23819 proposes the use of certain polyols and monofunctional additives like monoamines in making water-blown flexible foams to provide a positive effect on cell opening, amongst others.

Surprisingly a novel composition has been found and a process for preparing it. The novel composition has valuable properties which make it very useful as rheology modifying agent and in particular as cell opener in processes wherein cell opening is desired, especially in making polyurethane foams.

The present invention is concerned with a composition comprising a mixture of compounds of the formula:

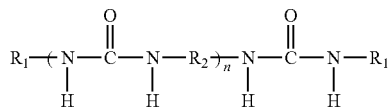

wherein
$R_1$ is a monoalkoxy polyoxyalkylene monovalent radical having an average molecular weight of 500-5000;
$R_2$ is a hydrocarbon divalent radical having an average molecular weight of 28-500;
n is at least 1 and the average of n is more than 1; and
wherein the mixture is present in the composition in an amount of at least 80 and preferably at least 90 mol %.

Further the present invention is related to a process for preparing such a composition by reacting a hydrocarbon compound containing 2 isocyanate groups, the hydrocarbon compound having an average molecular weight of 28-500 without the 2 isocyanate groups, a monoalkoxy polyoxyalkylene monoamine, having an average molecular weight of 500-5000 without the amine group, and water, wherein the molar ratio of the polyisocyanate, the monoamine and the water is X:2:Y wherein Y=0.1-10 and Y+0.9≦X≦Y+1.1.

Characterization of the composition prepared according to the process of the present invention revealed that it may contain a small amount of other material resulting from side reactions. This amount is less than 20 mol % and preferably less than 10 mol %.

Further the present invention is related to the use of such a composition as rheology modifying agent and preferably as cell opening agent.

Still further, the present invention is related to a process for making a polyurethane foam which process comprises reacting a polyisocyanate and an isocyanate-reactive compound and using a blowing agent and a composition according to the present invention and to foams made by this process.

In the context of the present invention the following terms have the following meaning:
1. The term "average nominal hydroxyl functionality" (or in short "functionality") is used herein to indicate the number average functionality (number of hydroxyl groups per molecule) of a polyol or a polyol composition on the assumption that this is the number average functionality (number of active hydrogen atoms per molecule) of the initiator(s) used in their preparation although in practice it will often be somewhat less because of some terminal unsaturation and other side reactions during production.
2. The word "average" refers to number average unless indicated otherwise.

The ingredients used for making the composition according to the present invention (i.e. the diisocyanate, the monoamine and the water) may be combined and mixed in any order at ambient conditions. Preferably the monoamine and the water are premixed. Once the 3 ingredients have been mixed the reaction is allowed to proceed under ambient conditions. Since the reaction is exothermic in general no further heating is required. 10-500 minutes after the combining of the 3 ingredients the reaction will be complete in general and the composition according to the invention is allowed to cool. The composition obtained is usually a dispersion which is useful as cell opener in making cellular products, in particular polyurethane foams.

The 3 ingredients are used in the molar ratio polyisocyanate:monoamine:water=X:2:Y, wherein Y=0.1-10, preferably 0.9-5 and most preferably 0.95-2.5; and wherein Y+0.9≦X≦Y+1.1 and preferably Y+0.95≦X≦Y+1.05.

Surprisingly it was found that the use of a small amount of an ionic inorganic salt and in particular of a metal halide and more in particular of LiCl in the process to make the composition according to the present invention gives a composition according to the invention with reduced turbidity. The ionic inorganic salt is preferably added via the water. The amount used preferably is 5-100% by weight calculated on the amount of water used.

The hydrocarbon compound containing 2 isocyanate groups may be selected from aliphatic, cycloaliphatic, araliphatic and aromatic ones such as hexamethylene, isophorone, dicyclohexylmethane, naphthalene, tetramethylxylene, phenylene, cyclohexane, toluene and diphenylmethane. Preferably the diisocyanate is an aromatic diisocyanate and most preferably diphenylmethane diisocyanate (MDI).

The monoamine is a monoalkoxy polyoxyalkylene monoamine having an average molecular weight 500-5000 without the amine group. The monoalkoxy group preferably has 1-20 and more preferably 1-6 and most preferably 1 carbon atom. The polyoxyalkylene group may consist of one or more types of oxyalkylene groups, like oxyethylene, oxypropylene and/or oxybutylene. Preferably the polyoxyalkylene radical is a polyoxyethylene polyoxypropylene radical, especially those having an oxyethylene content of 60-90% by weight. Such monoamines are commercially available; examples are Jeffamine™ M2005, ex Huntsman, which is a monoamine comprising a high amount of oxypropylene groups, and Jeffamine™ M1000 and M2070, ex Huntsman, which are monoamines comprising a high amount of oxyethylene groups.

Whether or not an inorganic salt is added, in either case the composition can be used as a cell opening agent. It was further found that when the composition according to the present invention was centrifuged, the precipitate and the supernatant both showed cell opening properties as well. The precipitate as well as the supernatant are compositions according to the present invention. Such centrifuging process may conveniently be conducted at ambient conditions at a centrifuge speed of 1000 to 10.000 rounds per minute for 10 to 1000 minutes. The supernatant and precipitate are subsequently separated by simply decanting the supernatant.

Processes for making polyurethane foams are widely known (without the use of the composition according to the present invention). According to the invention, polyisocyanates are reacted with isocyanate-reactive ingredients like polyols and polyamines using blowing agents, like hydrocarbons, e.g. pentane and cyclopentane; chlorofluorohydrocarbons; inert gasses, e.g. $N_2$, $CO_2$ or air; and/or water and using a composition according to the present invention and optionally using additives known in the art like chain extenders, cross-linkers, surfactants, catalysts, plasticizers, flame retardants, internal mould release agents, colorants and antimicrobial agents. The process may be conducted according to the one shot process or the prepolymer process. In the prepolymer process part or all of the polyols and polyamines may be pre-reacted with the polyisocyanate so as to obtain an isocyanate terminated prepolymer which subsequently is used to make the foam by reaction of this prepolymer with water which then acts as isocyanate-reactive compound and as—chemical—blowing agent at the same time (water reacts with isocyanate groups to give urea groups and $CO_2$ which is responsible for the blowing). Preferably the process is a process for preparing a flexible polyurethane foam and more in particular a hydrophilic flexible polyurethane foam which is made by reacting a polyisocyanate and a polyether polyol comprising at least 40% by weight of oxyethylene groups calculated on the weight of the polyol and using water as blowing agent in an amount of 0.5-50 parts by weight (pbw) per 100 parts by weight of polyisocyanate and polyol used to make the foam. The polyisocyanate, the polyol and the water may be combined and allowed to react in the presence of the cell opener; alternatively the polyisocyanate and the polyol may be prereacted into a so-called prepolymer and subsequently this prepolymer may be reacted with the water in the presence of the cell opener. The cell opener may be added in any way. Preferably it is added to the polyisocyanate or to the water before it is used. The amount of cell opener needed in general is rather small; it may vary between 0.0001-2 and preferably between 0.0001-1% by weight calculated on the amount of polyisocyanate and polyol used to make the foam. Most preferably the process is selected from 1) a process for making a hydrophylic polyurethane foam wherein an isocyanate-terminated prepolymer, 4.5-14.5 parts by weight of water (per 100 parts by weight of prepolymer) and 0.0001-1 parts by weight of a composition according to the invention (per 100 parts by weight of prepolymer) are used, wherein the prepolymer has an NCO-value of 3-15% by weight and has been made by reacting diphenylmethane diisocyanate comprising at least 40% by weight of 4,4'-diphenylmethane diisocyanate and an amine-free polyoxyethylene polyoxypropylene polyol having a nominal hydroxyl functionality of 2-4 and having an oxyethylene content of 40-90% by weight calculated on the weight of the polyol and an average molecular weight of 3000-6000 (surprisingly it was found that foams obtained according to this process had good properties and open cell structure and could be made without using any catalyst) and 2) a process for making a moulded polyurethane foam wherein a polyisocyanate, a polyol, 1-4 parts by weight of water (per 100 parts by weight of polyisocyanate and polyol) and 0.0001-1 parts by weight of a composition according to the invention (per 100 parts by weight of polyisocyanate and polyol) are used, wherein the polyisocyanate is a diphenylmethane diisocyanate comprising at least 40% by weight of 4,4'-diphenylmethane diisocyanate and the polyol is a polyoxyethylene polyoxypropylene polyol having a nominal hydroxyl functionality of 2-4 and having an oxyethylene content of 40-90% by weight calculated on the weight of the polyol and an average molecular weight of 3000-6000 and wherein the reaction is conducted in a closed mould. Further the present invention is related to a mixture comprising a polyisocyanate and a composition according to the present invention; preferably the mixture comprises 0.0001-25 and more preferably 0.0002-6 pbw of composition according to the present invention per 100 pbw of polyisocyanate. The polyisocyanate preferably is an aromatic one; more preferably one comprising MDI as described hereinbefore.

The invention is illustrated with the following examples:

EXAMPLE 1

8894.5 g of Jeffamine™ M2070 was poured into a heat insulated metal recipient, equipped with a stirrer.

While stirring, 31 g of water was added under ambient conditions. Immediately thereafter 1066.3 g of Suprasec™ 1306 (4,4'-MDI ex Huntsman) was added over a time span of 1 minute while stirring under ambient conditions. Stirring was continued and after about 30 minutes a maximum temperature of 70° C. was reached. After 4 hours the temperature was 55° C. Infrared analysis revealed that no free NCO groups were left and therefore the reaction was deemed complete.

The resulting product was a dispersion; the dispersed phase consisted of small particles which were visible by means of an optical microscope.

The product was further characterized via $^{13}$C-NMR (using dimethylsulphoxide as solvent and a magnetic field frequency of 400 MHz). The ratio of the integrals of the peaks of the urea groups formed by the amine, to those formed by the water and to a side-reaction impurity was about 215:100:9.

Based on the ingredients used, their amounts, the NCO-value and the NMR characterization the conclusion was that a product was obtained comprising at least 97.3 mole % of compounds according to the structure formula used in the present application wherein $R_1$ is a methoxylated polyoxyethylene polyoxypropylene radical having a molecular weight of about 2000 and a PO/EO molar ratio of about 10/32, $R_2$ is methylene diphenylene and n is about 2 on average and at most 2.7 mole % of other compounds resulting form side reactions.

EXAMPLE 2

The product obtained in example 1 was subjected to centrifugation (Heraeus Sepatech Megofuge 1.0) for 3 hours at 4300 rounds per minute (r.p.m.). The supernatant and the pellet obtained after decanting the supernatant were subjected to the same NMR characterization as example 1; the ratio of the peak integrals of the urea groups formed by the amine to those formed by the water was 13:1 for the supernatant and 0.22:1 for the precipitate.

EXAMPLE 3

Examples 1 and 2 were repeated with 8412.9 g of Jeffamine M2070, 66.65 g of water and 1520.4 g of Suprasec 1306. The ratio of the integral of the peaks was 100:101:7 (dispersion); 5.3:1 (supernatant) and 0.22:1 (pellet). The dispersion contained at least 96.5 mol % of the formula compound wherein $R_1$ and $R_2$ had the same meaning as in example 1 and n is about 3 on average and at most 3.5 mol % of other compounds resulting from side reactions.

EXAMPLE 4

Example 3 was repeated with an MDI comprising 50% by weight of 2,4'-MDI, Jeffamine M2070, water and LiCl in an amount of 40% by weight calculated on the amount of water (the LiCl was dissolved in the water). A clear liquid was obtained.

EXAMPLE 5

Example 1 was repeated with Suprasec 1306, Jeffamine M2005 and water. The product was a gel. When LiCl was used as in example 4 a stable dispersion was obtained.

EXAMPLE 6

Comparative 100 pbw of Suprasec 1002, an isocyanate-terminated prepolymer ex Huntsman, was thoroughly mixed with 5 pbw of water using a conventional bench mixer. The foaming composition was allowed to rise freely.

The resulting foam had extremely closed cells; it was not possible to crush the foam in a usual way.

EXAMPLE 7

Comparative

Example 1 was repeated using a molar ratio of Suprasec 1306 to dried Jeffamine M2070 of 1:2 and no water. A clear liquid was obtained. $^{13}$C-NMR characterization as in example 1 revealed a structure of the formula compound with the same $R_1$ and $R_2$ as in example 1 and n=1.

EXAMPLE 8

Comparative

Example 6 was repeated with 5% w of the product of example 7 in the water (calculated on the water). The foam had extremely closed cells and could not be crushed in a usual way.

EXAMPLE 9

Example 6 was repeated but with 5% w of the product of example 1 in the water (calculated on the water). The foam had open cells and the foam did not shrink.

EXAMPLE 10

Example 6 was repeated but with 2.5% w of the product of example 1 in the water (calculated on the water). The foam had open cells and the foam did not shrink. A similar result was obtained when the supernatant and the precipitate of example 2 were used.

EXAMPLE 11

Comparative

Example 6 was repeated with 5% w of Jeffamine M 2070 in the water (calculated on the water).

The foam obtained was closed and not crushable in a usual way.

EXAMPLE 12

Comparative

Example 11 was repeated with 5% w of Jeffamine M 2070 (calculated on the polyisocyanate). The foam obtained was closed and uncrushable in a usual way.

EXAMPLE 13

Suprasec 1002 mixed with the product of example 1 wherein the amount of product of example 1 is 0.0025, 0.025 and 0.25 pbw respectively (on 100 pbw of Suprasec 1002) with a standard lab mixer at room temperature gives a stable (at least 24 h at room temperature) mixture.

EXAMPLE 14

A mixture of Suprasec 2020 and Suprasec 1306 (50/50 w/w) mixed with the product of example 1 in an amount of 0.0025, 0.025 and 0.25 pbw respectively (on 100 pbw of polyisocyanate) with a standard lab mixer at room temperature gives a stable (at least 24 h at room temperature) mixture.

EXAMPLE 15

A polyisocyanate consisting of 50% by weight of Suprasec 2020 and 50% by weight of Suprasec 1306 was reacted in a mould at index=100 with 100 parts by weight (pbw) of Daltocel F555, 3 pbw of Daltocel F526, 1 pbw of Jeffcat ZR50 and 2.53 pbw of water comprising about 1% by weight of the cell opener of example 1. The foam obtained had a core density of 61 kg/m$^3$ and had open cells. When the cell opener was not used the foams had more closed cells and could not be easily crushed.

Daltocel F555 is a polyether polyol having an oxyethylene content of about 75% by weight, ex Huntsman.

Jeffcat ZR50 is an amine catalyst, ex Huntsman.

Daltocel 526 is a polyoxyethylene polyol, ex Huntsman.

Suprasec 2020 is a uretonimine modified MDT ex Huntsman (Suprasec, Daltocel and Jeffcat are trademarks of Huntsman International LLC).

The invention claimed is:

1. A composition comprising a compound formed from a reaction mixture comprising (i) a polyisocyanate, (ii) a monoamine, and (iii) water, and wherein the compound comprises the following formula:

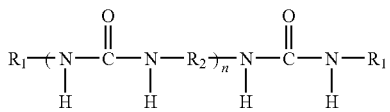

wherein $R_1$ is a monoalkoxy polyoxyalkylene monovalent radical having an average molecular weight of 500-5000;

$R_2$ is a hydrocarbon divalent radical having an average molecular weight of 28-500; and n is at least 1; and wherein the molar ratio of the polyisocyanate, monoamine, and water is X:2:Y wherein Y=0.1-10 and Y+0.95≦X≦Y+1.05; and wherein the compound comprises at least 80 mol % of the composition.

2. Composition according to claim 1 wherein $R_1$ is a monoalkoxy polyoxyethylene polyoxypropylene radical.

3. Composition according to claim 2 wherein the oxyethylene content in the radical is 60-90% by weight.

4. Composition according to claim 1 wherein the monoalkoxy group has 1-20 carbon atoms.

5. Composition according to claim 4 wherein the monoalkoxy group has 1-6 carbon atoms.

6. Composition according to claim 1 wherein the monoalkoxy group is methoxy.

7. Composition according to claim 1 wherein $R_2$ is an aromatic radical.

8. Composition according to claim 1 wherein $R_2$ is a diphenylenemethylene radical.

9. The composition according to claim 1 wherein said composition is a cell opening agent or a rheology modifying agent.

10. The composition according to claim 1 wherein the compound comprises at least 90 mol % of the composition.

11. A process comprising:
reacting a reaction mixture comprising (i) a polyisocyanate, (ii) a monoamine, and (iii) water, to form a reaction product comprising the following formula:

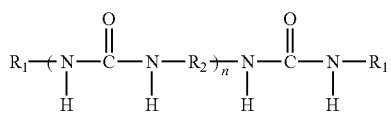

wherein $R_1$ is a monoalkoxy polyoxyalkylene monovalent radical having an average molecular weight of 500-5000;

$R_2$ is a hydrocarbon divalent radical having an average molecular weight of 28-500; and n is at least 1; and wherein the molar ratio of the polyisocyanate, monoamine, and water is X:2:Y wherein Y=0.1-10 and Y+0.95≦X≦Y+1.05; and wherein the compound comprises at least 80 mol % of the composition.

* * * * *